US008671100B2

(12) United States Patent
Kitayama

(10) Patent No.: US 8,671,100 B2
(45) Date of Patent: Mar. 11, 2014

(54) APPARATUS, SYSTEM AND METHOD FOR PROVIDING CONTENTS AND USER INTERFACE PROGRAM

(75) Inventor: Tomoya Kitayama, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 500 days.

(21) Appl. No.: 12/576,518

(22) Filed: Oct. 9, 2009

(65) Prior Publication Data

US 2010/0100550 A1    Apr. 22, 2010

(30) Foreign Application Priority Data

Oct. 22, 2008   (JP) ................................. 2008-272433

(51) Int. Cl.
*G06F 17/30* (2006.01)
(52) U.S. Cl.
USPC ......................................................... 707/741
(58) Field of Classification Search
None
See application file for complete search history.

(56) References Cited

U.S. PATENT DOCUMENTS

| | | | |
|---|---|---|---|
| 5,848,410 A * | 12/1998 | Walls et al. ............................ | 1/1 |
| 6,563,999 B1 | 5/2003 | Suzuoki | |
| 6,734,881 B1 * | 5/2004 | Will ................................ | 715/811 |
| 6,820,076 B2 * | 11/2004 | Bailey et al. .................... | 707/770 |
| 7,228,556 B2 * | 6/2007 | Beach et al. ..................... | 725/53 |
| 7,487,145 B1 * | 2/2009 | Gibbs et al. ............................ | 1/1 |
| 7,499,940 B1 * | 3/2009 | Gibbs .................................... | 1/1 |
| 2004/0078816 A1 * | 4/2004 | Johnson .......................... | 725/52 |
| 2004/0183833 A1 * | 9/2004 | Chua .............................. | 345/773 |
| 2004/0194141 A1 * | 9/2004 | Sanders .......................... | 725/53 |
| 2005/0283468 A1 * | 12/2005 | Kamvar et al. ................... | 707/3 |
| 2006/0085819 A1 * | 4/2006 | Bruck et al. ...................... | 725/52 |
| 2006/0106769 A1 * | 5/2006 | Gibbs ............................... | 707/3 |
| 2007/0299867 A1 * | 12/2007 | Baldwin et al. ........... | 707/103 R |
| 2008/0235621 A1 * | 9/2008 | Boillot ........................... | 715/810 |
| 2008/0276171 A1 * | 11/2008 | Sabo ................................. | 715/711 |
| 2009/0043741 A1 * | 2/2009 | Kim .................................. | 707/3 |

* cited by examiner

*Primary Examiner* — Richard Bowen
(74) *Attorney, Agent, or Firm* — Matthew B. Dernier, Esq.; Gibson & Dernier LLP

(57) ABSTRACT

A character folder generator generates one or more character folders, each of which corresponds to a specific character, at each layer of a hierarchical folder structure, and provides a terminal with information of said one or more character folders generated at each layer. A folder ID obtainer obtains identification information of the selected character folders from the terminal, when one of the character folders at each layer is selected at the terminal. A character sequence generator generates a character sequence identified based on a sequence of the character folders, each of which has been selected at each layer. A searcher searches for files by using as a keyword the generated character sequence and generates one or more files retrieved by search in the character folder finally selected at a certain layer and providing the terminal with information of the generated files in the finally selected character folder.

8 Claims, 17 Drawing Sheets

| ID | PID | NAME |
|---|---|---|
| 1 | 0 | VIDEO |
| 2 | 0 | AUDIO |
| 3 | 0 | IMAGE |
| 4 | 1 | SEARCH |
| 5 | 4 | a |
| 6 | 4 | b |
| 7 | 4 | c |
| ⋮ | ⋮ | ⋮ |
| 12 | 4 | h |
| ⋮ | ⋮ | ⋮ |
| 30 | 4 | z |
| 31 | 12 | PREDICTIVE TRANSLATION |
| 32 | 12 | a |
| ⋮ | ⋮ | ⋮ |
| 46 | 12 | o |
| ⋮ | ⋮ | ⋮ |
| 57 | 12 | z |

| | | |
|---|---|---|
| 58 | 46 | PREDICTIVE TRANSLATION |
| 59 | 46 | a |
| ⋮ | ⋮ | ⋮ |
| 70 | 46 | l |
| ⋮ | ⋮ | ⋮ |
| 84 | 46 | z |
| 85 | 70 | PREDICTIVE TRANSLATION |
| 86 | 70 | a |
| ⋮ | ⋮ | ⋮ |
| 97 | 70 | l |
| ⋮ | ⋮ | ⋮ |
| 111 | 70 | z |
| 112 | 97 | PREDICTIVE TRANSLATION |
| 113 | 97 | a |
| ⋮ | ⋮ | ⋮ |
| 137 | 97 | y |
| ⋮ | ⋮ | ⋮ |
| 138 | 97 | z |

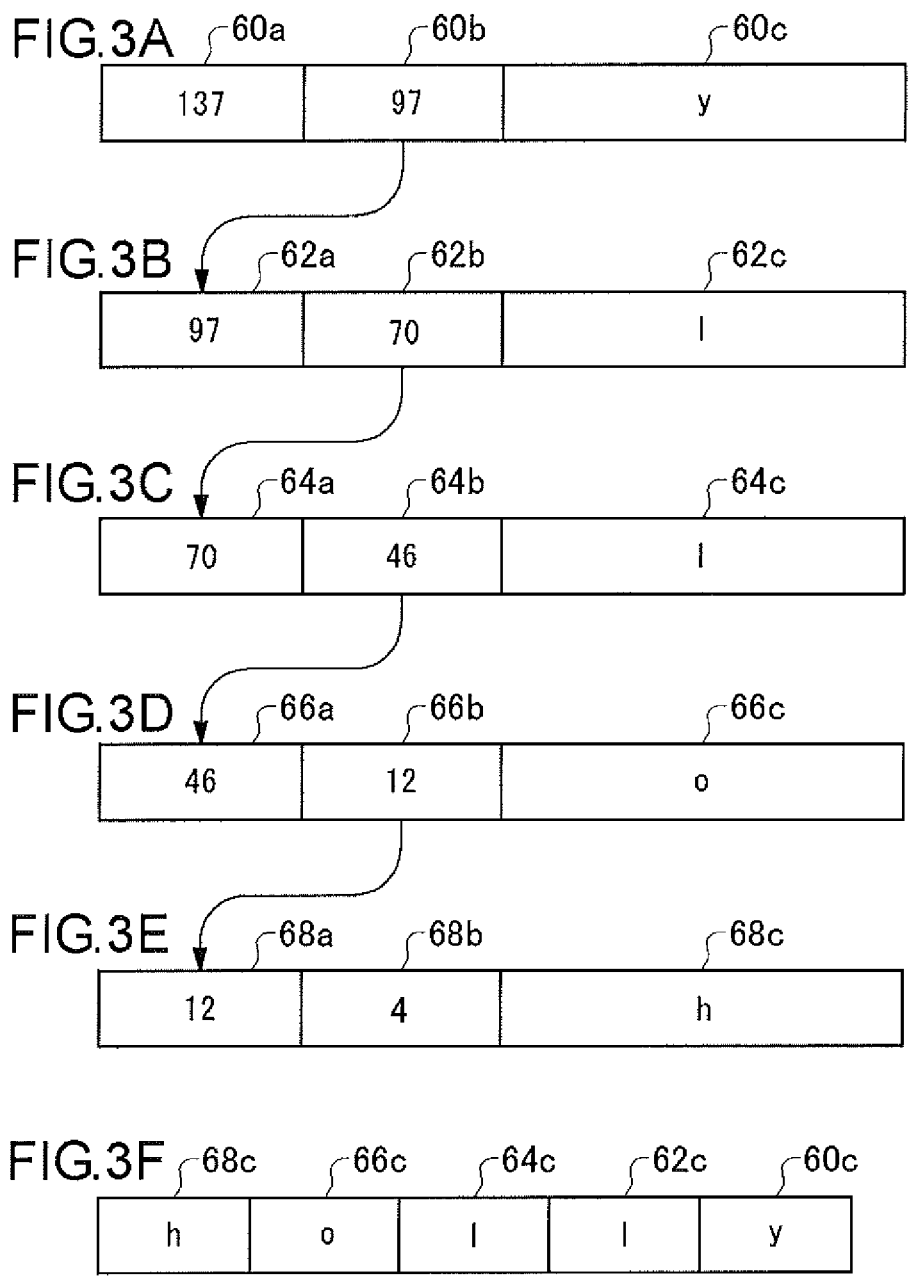

APPARATUS, SYSTEM AND METHOD FOR PROVIDING CONTENTS AND USER INTERFACE PROGRAM

BACKGROUND OF THE INVENTION

1. Field of the Invention

The present invention relates to an apparatus, system, and method for providing contents stored in a server, and to user interface technology.

2. Description of the Related Art

Since computer networks have widely been used at home, it is common to connect computers in different rooms with each other via a wireless LAN and to share a printer among the computers. Furthermore, a still image captured by a digital camera and a video downloaded from the Internet is not only stored in a computer, but the image and the video stored in the computer will be also displayed on a television system screen in a living room via a network and viewed by family members.

Digital Living Network Alliance (DLNA) is an industry standard for interconnecting the electronic appliances at home that are supplied by different manufacturers. A DLNA server stores a large number of contents such as movies, music, or images that have been obtained by a personal video camera, a digital camera, audio play software with a ripping function or the like, or alternatively downloaded via the Internet.

U.S. Pat. No. 6,563,999 discloses a game console with an audio and visual function.

It is difficult to manage a large number of contents stored in the DLNA server in such a manner that the contents can be easily browsed. In particular, if the family members share the DLNA server and/or a number of network appliances are clients of the DLNA server, the enormous amount of the contents will be stored in the DLNA server. As a result, there will be limitations to the management of the contents using a hierarchical structure of folders provided by a conventional operating system. If a user does not memorize in which folder a desired content has been stored, it is difficult to find out the content. As long as the user relies on his/her memory, the larger number of contents the DLNA server manages, the more difficult it becomes for the user to reach the desired content.

SUMMARY OF THE INVENTION

In this background, a general purpose of the present invention is to provide a technology by which users can easily search for content managed by a content server.

One embodiment of the present invention relates to a computer program product embodied on a computer readable recording medium having a computer program. The program comprises: a code module for generating one or more character folders, each of which corresponds to a specific character, at each layer of a hierarchical folder structure; a code module for providing a terminal with information of said one or more character folders generated at each layer; a code module for, when one of the character folders at each layer is selected at the terminal, obtaining identification information of the selected character folders from the terminal; a code module for searching for files by using as a keyword a character sequence identified based on a sequence of the character folders, each of which has been selected at each layer; and a code module for generating one or more files retrieved by a search in the character folder finally selected at a certain layer and providing the terminal with information of the generated files in the finally selected character folder.

Another embodiment of the present invention also relates to a computer readable medium storing a compute program. The program comprises: a code module for providing one or more character folders, each of which corresponds to a specific character, at each layer of a hierarchical folder structure; a code module for receiving an operation for selecting one of the character folders while the folder hierarchy is traced layer by layer; and a code module for displaying in the character folder finally selected at a certain layer one or more files searched by using as a keyword a character sequence identified based on a sequence of the character folders, each of which has been selected at each layer.

These programs may be provided as a part of basic software or from libraries embedded in an operating system. A computer readable storage medium having these programs embodied therein may be provided for supplying the firmware or updating at least a part of the firmware. Alternatively, these programs may be transmitted via a communication line.

Yet another embodiment of the present invention relates to a content providing apparatus. The apparatus comprises: a character folder generator which generates one or more character folders, each of which corresponds to a specific character, at each layer of a hierarchical folder structure, and provides a terminal with information of said one or more character folders generated at each layer; a folder identification information obtainer that, when one of the character folders at each layer is selected at the terminal, obtains identification information of the selected character folders from the terminal; a character sequence generator that generates a character sequence identified based on a sequence of the character folders, each of which has been selected at each layer; and a searcher that searches for files by using as a keyword the generated character sequence and that generates one or more files retrieved by a search in the character folder finally selected at a certain layer and that provides the terminal with information of the generated files in the finally selected character folder.

Yet another embodiment of the present invention relates to a content providing method. The method comprises: generating one or more character folders, each of which corresponds to a specific character, at each layer of a hierarchical folder structure and providing a terminal with information of said one or more character folders generated at each layer; obtaining identification information of the selected character folders from the terminal, when one of the character folders at each layer is selected at the terminal; generating a character sequence identified based on a sequence of the character folders, each of which has been selected at each layer; and searching for files by using as a keyword the generated character sequence and generating one or more files retrieved by search in the character folder finally selected at a certain layer and providing the terminal with information of the generated files in the finally selected character folder.

Optional combinations of the aforementioned constituting elements, and implementations of the invention in the form of methods, processors, apparatuses, systems, computer programs, data structures, recording media, etc. may also be practiced as additional may also be practiced as additional modes of the present invention.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which:

FIG. 2 explains an example of a folder ID table stored in the folder ID table storage of FIG. 1;

FIGS. 3a-3f explains how the character sequence generator of FIG. 1 identifies a sequence of character folders selected by a user;

DETAILED DESCRIPTION OF THE INVENTION

Figure 1:
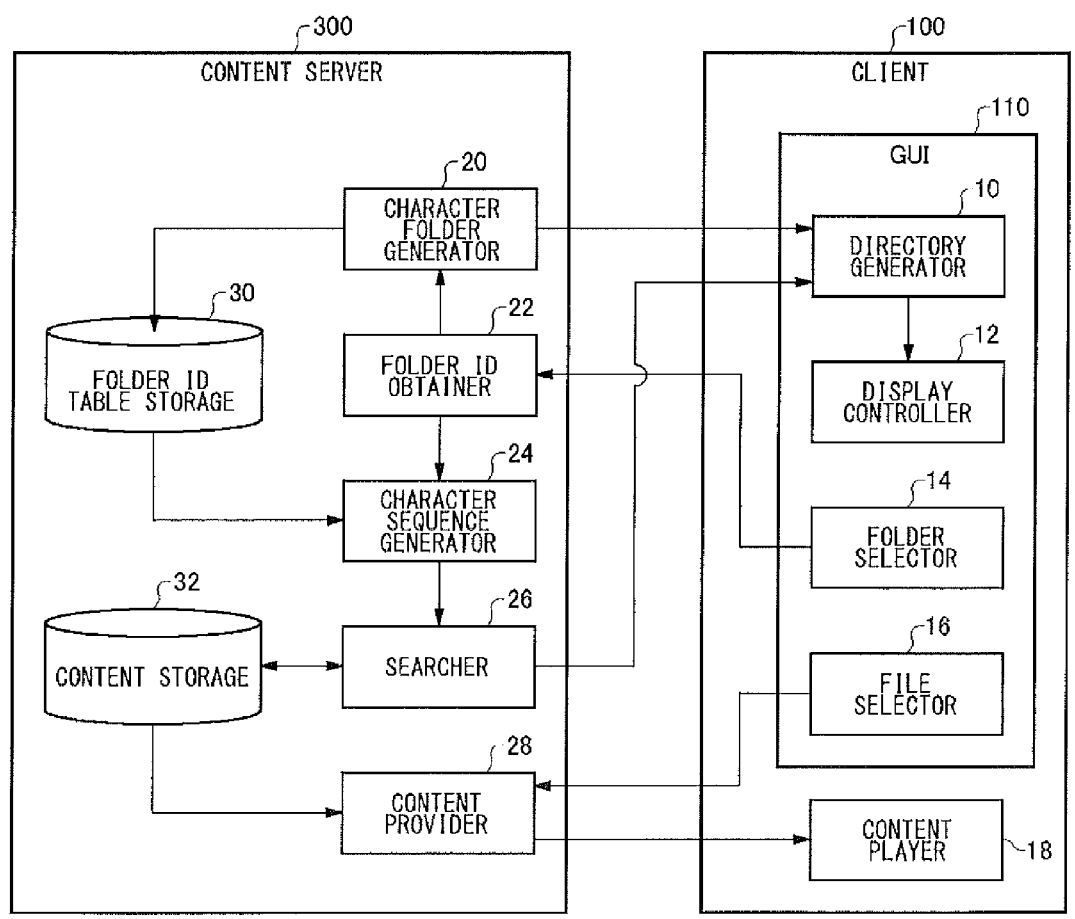
FIG. 1 is a block diagram of a content search system according to an embodiment of the present invention.

The invention will now be described by reference to the preferred embodiments. This does not intend to limit the scope of the present invention, but to exemplify the invention. FIG. 1 is a block diagram of a content search system according to an embodiment of the present invention. Upon receipt of a request for browsing contents from a client connected via a network, a content server 300 provides the contents to the client 100. For instance, the content server 300 is a DLNA server, and the client 100 is a DLNA player. The client 100 that conforms to the DLNA standard may be, for instance, a digital television set, an audio amplifier, a game console, or the like.

The DLNA server usually transmits to the DLNA player the information regarding the folders and files on the DLNA server, which have been registered by a user, without modification.

For instance, consider that a common folder called "photo" is registered in the DLNA server, and the following folder and files are stored in the "photo" folder:

"Foo" (folder),
Test1.JPG (JPEG file),
Test2.JPG (JPEG file).

When the DLNA player accesses the common folder in the DLNA server, the "photo" folder is first displayed on the display device of the DLNA player. The DLNA player is provided with a graphical user interface for supporting user operations while the hierarchal directory is being displayed in the form of folders. If the user opens the "photo" folder displayed on the screen, the "Foo" folder and the two files, test1.JPG and test2.JPG, will be displayed therein.

The DLNA player can thus transparently access the folders and files under the common folder defined by the DLNA server. In this embodiment, when the DNLA player searches for the contents managed by the DLNA server, the interface for the user to manipulate the hierarchal directory in a form of folders will be used without modification. A sequence of characters will be identified during the process in which the user selects some character folders one after another while he/she is tracing the hierarchal structure downwards. The final character sequence will be identified as a target keyword by using, if appropriate, word predictive translation. When the user opens the folder that was finally selected, the DLNA server searches for the contents by using the keyword, and a list of contents that matches with the keyword will be displayed under the folder. The structure related to the content search technology according to this embodiment will be hereinafter explained with reference to FIG. 1.

Conforming to the DLNA standard, the client 100 includes a graphical user interface (GUI) 110 for receiving user manipulation data while displaying the hierarchal directory in a form of folders and a content player 18 for playing the content selected by the user in the folder.

The GUI 110 includes a directory generator 10, a display controller 12, a folder selector 14, and a file selector 16. The directory generator 10 receives the directory information provided by the content server 300, generates the hierarchal directory in the form of folders, and provides it to the display controller 12. The display controller 12 displays the hierarchy of the directory and the folders included in the directory currently being browsed.

When the user selects any one of the folders in the current directory, the folder selector 14 transmits the ID of the selected folder to the folder ID obtainer of the content server 300. When the user selects one of files in the folder, the file selector 16 transmits the ID of the selected file to the content provider 28 of the content server 300.

Conforming to the DLNA standard, the content server 300 provides the directory information in the form of hierarchal folders to the GUI 110 of the client 100.

The character folder generator 20 generates one or more character folders, each of which corresponds to a specific character. A character folder herein corresponds to one character of the alphabetic characters "a" to "z". In accordance with the language used in the client 100, the character folders may be generated, each of which corresponds to one character of not only the alphabetic characters but also the Japanese syllabary characters (Hiragana).

The character folder generator 20 stores a folder ID table that contains the names and IDs of the generated character folders in the ID table storage 30. The folder ID table stores the association of the name and a unique identification number ID of the generated folder and the ID of the parent folder that the generated folder belongs to.

The folder ID obtainer 22 receives from the folder selector 14 the ID of the folder selected by the user. The folder ID obtainer 22 notifies the character folder generator 20 of the ID of the selected ID.

The character folder generator 20 generates the character folders, each of which corresponds to one character of the alphabetic characters "a" to "z", in the folder selected by the user, which has been notified by the folder ID obtainer 22. Then, the character folder generator 20 stores in the folder ID table an association of the name and the ID of each of the generated character folders and the ID of its parent folder.

Whenever the folder ID obtainer 22 notifies the character folder generator 20 of the ID of the character folder selected by the user, the character folder generator 20 further generates alphabetic-character folders under the selected character folder. When the user select some specific character folders one after another while he/she is tracing the hierarchal folders downwards, a character sequence will be identified based on a sequence of the selected character folders. When the user selects the final character folder and then at the end selects a folder for designating confirmation of the character sequence, the folder ID obtainer 22 notifies the ID of the selected folder to the character sequence generator 24.

The character sequence generator 24 generates a character sequence based on the sequence of the character folders that the user has selected while he/she is tracing the folder hierarchy downwards and provides the searcher 26 with the generated character sequence as a keyword. The character sequence generator 24 traces the parent ID back by using the ID of the character folder finally selected so as to identify the character folder at one level higher in the hierarchy. By repeating this procedure, the character sequence generator 24 can identify the sequence of the character folders designated by the user and generate the character sequence that the user has attempted to specify.

The searcher 26 searches for the contents in the content storage 32 by using as a keyword the character sequence generated by the character sequence generator 24. The searcher 26 provides the directory generator 10 of the client 100 with the content files retrieved by the search. The directory generator 10 generates a directory in which the content files provided by the searcher 26 are included in the folder finally selected by the user. The display controller 12 controls the display of the files obtained by the search in the folder, which was selected at the end by the user to confirm the character sequence.

When the user selects any one of the files obtained by the search in the final folder, the file selector 16 transmits the ID of the selected file to the content provider 28 of the content server 300. The content provider 28 reads from the content storage 32 the content file designated through the file ID and transmits it to the content player 18 of the client 100. Then the content player 18 plays the content file.

FIG. 2 explains an example of the folder ID table stored in the folder ID table storage 30. The folder ID table stores an association of the name, the ID of a folder, and the ID of the parent folder that the current folder belongs to (hereinafter referred to as "parent ID" or "PID"). Each folder generated by the character folder generator 20 will be assigned a unique identification number ID. The ID of the root folder is zero.

In the example shown here, there are three folders under the root: VIDEO, AUDIO, and IMAGE. The IDs of the respective folders are 1, 2, and 3. The PID of all of them is zero, which is the ID of the parent folder or the root.

Under the VIDEO folder, there is a SEARCH folder whose ID is 4 and whose PID is 1, which is the ID of the VIDEO folder.

When the user selects the SEARCH folder under the VIDEO folder, the character folder generator 20 generates the character folders from "a" to "z" with its PID of 4, which is the ID of the SEARCH folder and assigns the generated folders with the IDs of 5 to 50 (see numeral 50). This is called the first character folder layer.

Next, when the user selects the "h" folder in the first character folder layer, a PREDICTIVE TRANSLATION folder and the character folders from "a" to "z", the PID of all being 12, which is the ID of the "h" folder, are generated under the "h" folder of the first layer, and the IDs of "31" to "57" are assigned to them (see numeral 52). This is called the second layer.

When the user further selects the "o" folder in the second layer, a PREDICTIVE TRANSLATION folder and the character folders from "a" to "z", the PID of all being 46, which is the ID of the "o" folder, are generated under the "o" folder of the second layer, and the IDs of "58" to "84" are assigned to them (see numeral 54). This is called the third layer.

When the user further selects the "l" folder in the third layer, a PREDICTIVE TRANSLATION folder and the character folders from "a" to "z", the PID of all being 70, which is the ID of the "l" folder, are generated under the "l" folder of the third layer, and the IDs of "85" to "111" are assigned to them (see numeral 56). This is called the fourth layer.

When the user further selects the "l" folder in the fourth layer, a PREDICTIVE TRANSLATION folder and the character folders from "a" to "z", the PID of all being 97, which is the ID of the "l" folder, are generated under the "l" folder of the fourth layer, and the IDs of "112" to "138" are assigned to them (see numeral 58). This is called the fifth layer.

Lastly, when the user the "y" folder in the fifth layer, the ID "137" of the "y" folder is finally transmitted to the folder ID obtainer 22.

The folder ID obtainer 22 notifies the character sequence generator 24 of the ID "137" of the finally selected "y" folder. Based on the ID of the finally selected "y" folder, the character sequence generator 24 identifies a sequence of the character folders that the user has selected while he/she was tracing the folder hierarchy downwards.

FIGS. 3*a*-3*f* explains how the character sequence generator 24 identifies the sequence of the character folders selected by the user.

First, the character sequence generator 24 refers to the folder ID table to obtain the ID information of the finally selected "y" folder (FIG. 3*a*). The PID of the "y" folder is 97 (numeral 60*b*). The character sequence generator 24 obtains from the folder ID table the "l" folder whose ID is the PID "97" (FIG. 3*b*). Next, the generator 24 obtains from the folder ID table yet another "l" folder whose ID equals the PID "70" (numeral 62*b*) of the last "l" folder (FIG. 3*c*). Furthermore, the generator 24 obtains from the folder ID table the "o" folder whose ID equals the PID "46" (numeral 64*b*) of the last "l" folder (FIG. 3*d*). Likewise, the generator 24 obtains from the folder ID table the "h" folder whose ID equals the PID "12" (numeral 66*b*) of the last "o" folder (FIG. 3*e*).

Thus, the sequence of the character folders (60*c*, 62*c*, 64*c*, 66*c*, 68*c*) selected by the user is identified by tracing back the hierarchy of the character folders upwards based on the PIDs. As a result, the character sequence "holly" is generated as shown in FIG. 3*f*.

Figure 4:
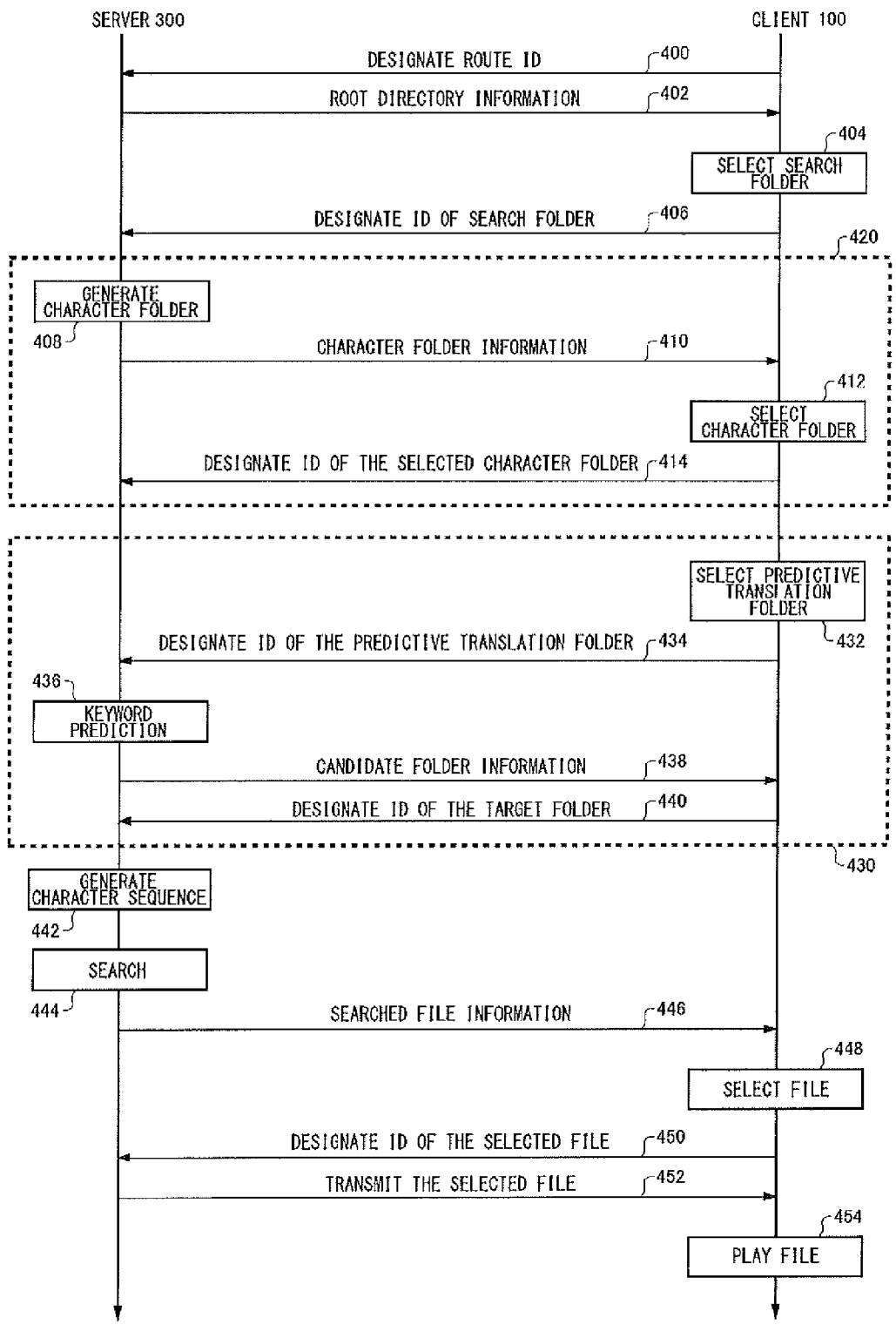
FIG. 4 is a sequence diagram to explain a procedure of searching contents according to an embodiment of the present invention.

FIG. 4 is a sequence diagram to explain the procedure of searching the contents according to the embodiment. With reference to FIGS. 5 to 15 showing some examples of the screen, explained is how the contents are searched with a keyword specified by sequentially selecting the character folders while tracing the folder hierarchy downwards.

The DLNA adopts the UPnP AV standard to manage and transmit the content information. The UPnP communication uses HTTP protocols, and the communication is done by exchanging files in an XML format.

The UPnP AV defines a MediaServer that is a transmitter of the content and a MediaRenderer that is a player of the content. In the present embodiment, the content server 300 corresponds to a MediaServer, and the client 100 corresponds to a MediaRenderer. The content search technology according to the embodiment is installed in the content server 300 that is a MediaServer.

The MediaServer provides the MediaRenderer with a service called ContentDirectory while the MediaRenderer calls the Browse actions defined in the ContentDirectory so as to obtain the file information and the directory information. The actual flow of the process is herein explained by using a command called BrowseDirectChildren, which is representative of the Browse actions.

The client 100 issues a command "BrowseDirectChildren 0" to the content server 300 (Step 400). The BrowseDirectChildren is an action for obtaining all information of the files and directory existing below the layer of the designated ID. Since the root ID is zero, the client 100 can obtain the information of the root folder of the content server 300 by issuing the command "BrowseDirectChildren 0."

The content server 300 sends back to the client 100 the root directory information (Step 402). In this example, the following folder information in the root is provided to the client 100.

| Type | name | ID | PID |
|---|---|---|---|
| container | VIDEO | 1 | 0 |
| container | AUDIO | 2 | 0 |
| container | IMAGE | 3 | 0 |

Each folder contains information regarding its type, name, ID, and PID. The ID is an identification number that is uniquely assigned to the folder and the PID is the ID of the parent folder that the current folder belongs to. The IDs of the VIDEO, AUDIO, and IMAGE folders are 1, 2, and 3, respectively, and the PID thereof is "0", which is the ID of the root folder.

Figure 5:
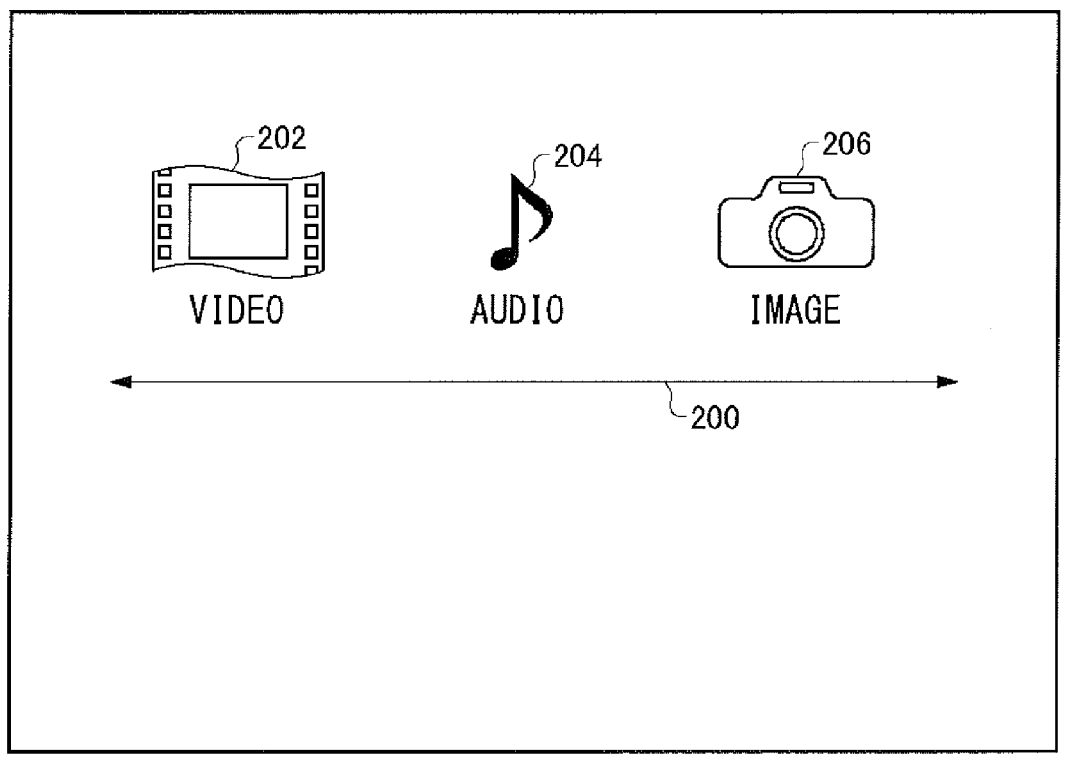
FIGS. 5-17 show some examples of a screen of a display device of the client of FIG. 1.

As shown in FIG. 5, the folder icons (numerals 202, 204, and 206) of the VIDEO, AUDIO, and IMAGE folders are displayed on the display device of the client 100. The user can select and open any one of the folder icons while he/she scrolls the screen in a horizontal direction 200 via the GUI 110. Consider that the user selects and opens the VIDEO folder icon.

When the user selects the VIDEO folder icon, the client 100 issues the command, "BrowseDirectChildren 1," which designates the ID "1" of the VIDEO folder, to the content server 300.

The content server 300 sends back to the client 100 the information of the folder(s) that exists in the video folder. In this example, the following folder information is returned.

| Type | name | ID | PID |
|---|---|---|---|
| container | search | 4 | 1 |

Figure 6:
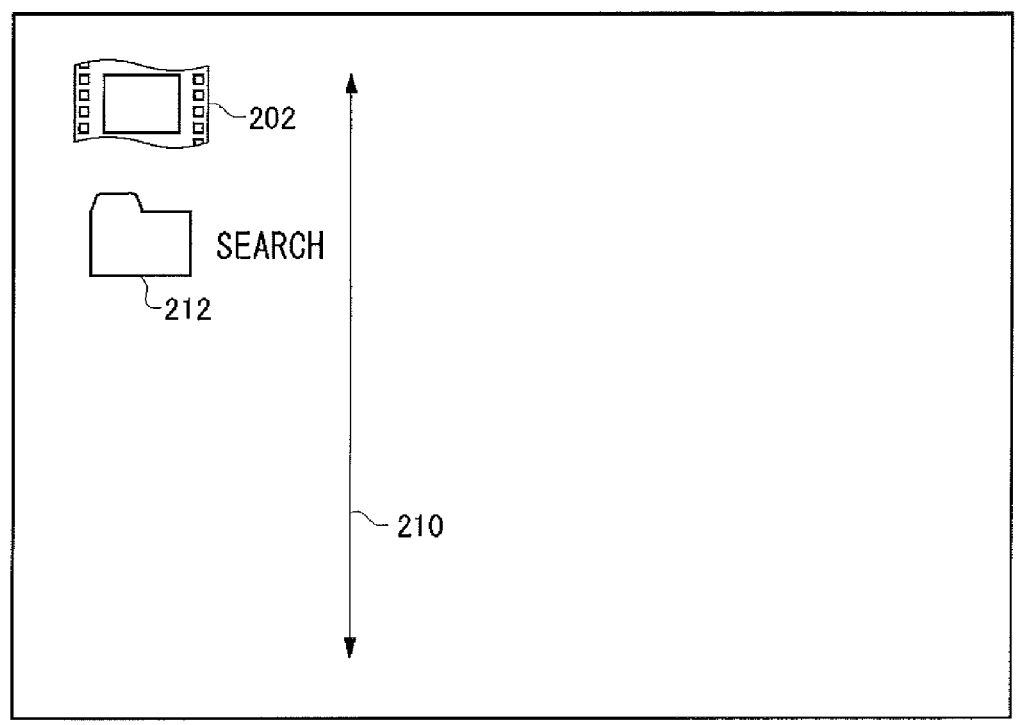

As shown in FIG. 6, the SEARCH folder is displayed on the screen of the client 100. The user can select a folder while he/she scrolls the screen in a vertical direction 210. (In general, there will be a plurality of folders displayed in the vertical direction 210, although there is a single folder in the VIDEO folder in this example.)

When the user selects the SEARCH folder (Step 404), the client 100 issues the command, "BrowseDirectChildren 4," which designates the ID "4" of the SEARCH folder (Step 406), to the content server 300.

Upon the receipt of the selection of the SEARCH folder from the client 100, the content server 300 generates the character folders from "a" to "z" in the SEARCH folder (Step 408).

The content sever 300 sends back to the client 100 the information of the character folders that exist in the SEARCH folder as shown below.

| Type | name | ID | PID |
|---|---|---|---|
| container | a | 5 | 4 |
| ... | | | |
| container | z | 30 | 4 |

Figure 7:
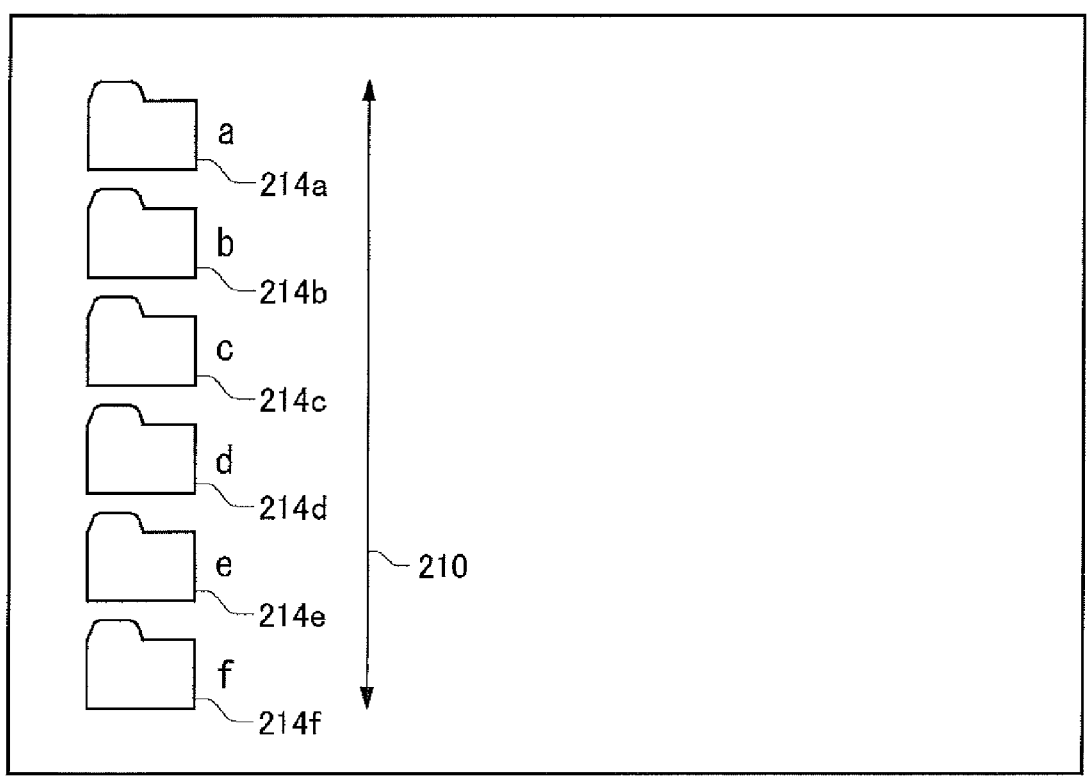
Figure 8:
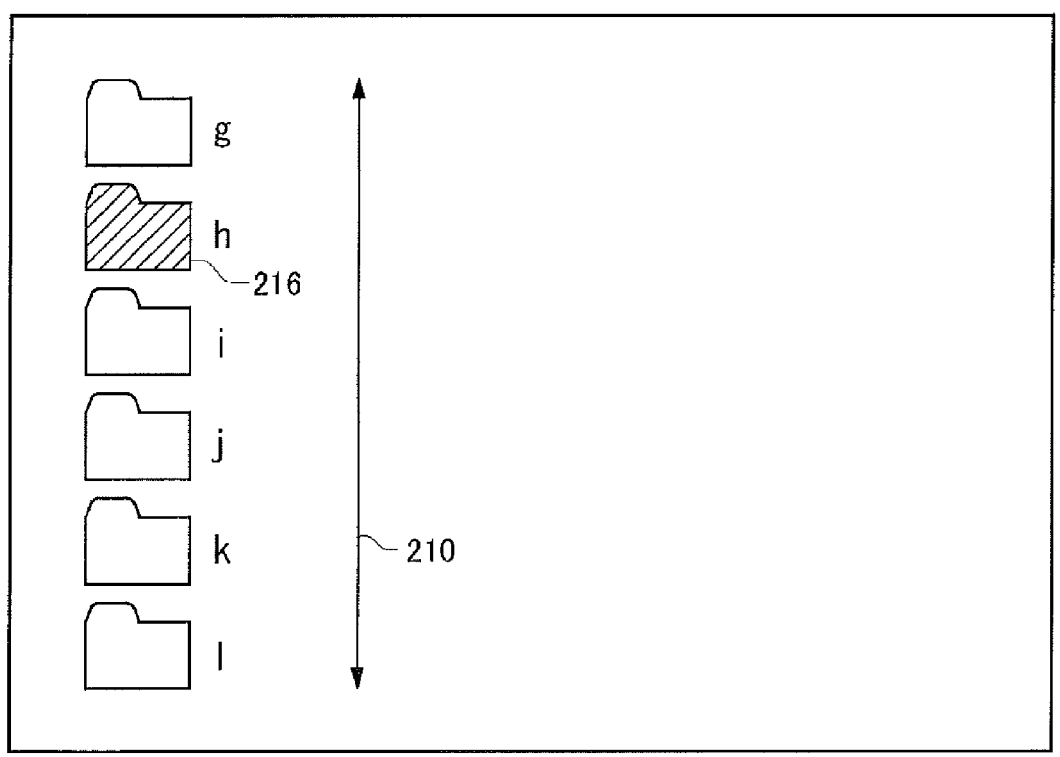

As shown in FIG. 7, among the character folders from "a" to "z", only the character folders that fall in the display range of the screen in the vertical direction 210 are displayed (numerals 214a to 214f). The user scrolls the screen in the vertical direction 210 to see and select a desired character folder (Step 412). Consider that the user selects and opens the "h" folder (numeral 216) as shown in FIG. 8.

The client 100 issues the command, "BrowseDirectChildren 12," which designates the ID "12" of the selected "h" folder, to the content server 300.

The content server 300 further generates the character folders from "a" to "z" in the "h" folder of the first layer (Step 408). At the second layer, a PREDICTION TRANSLATION folder and a CONFIRMATION folder are also generated as well as the character folders from "a" to "z". For the convenience of the explanation, only the PREDICTION TRANSLATION folder is herein generated as well as the character folders from "a" to "z".

The content server 300 sends back to the directory generator 10 the information of the character folders that exist in the "h" folder of the first layer as shown below (Step 410).

| Type | name | ID | PID |
|---|---|---|---|
| container | prediction translation | 31 | 12 |
| container | a | 32 | 12 |
| ... | | | |
| container | z | 57 | 12 |

Figure 9:
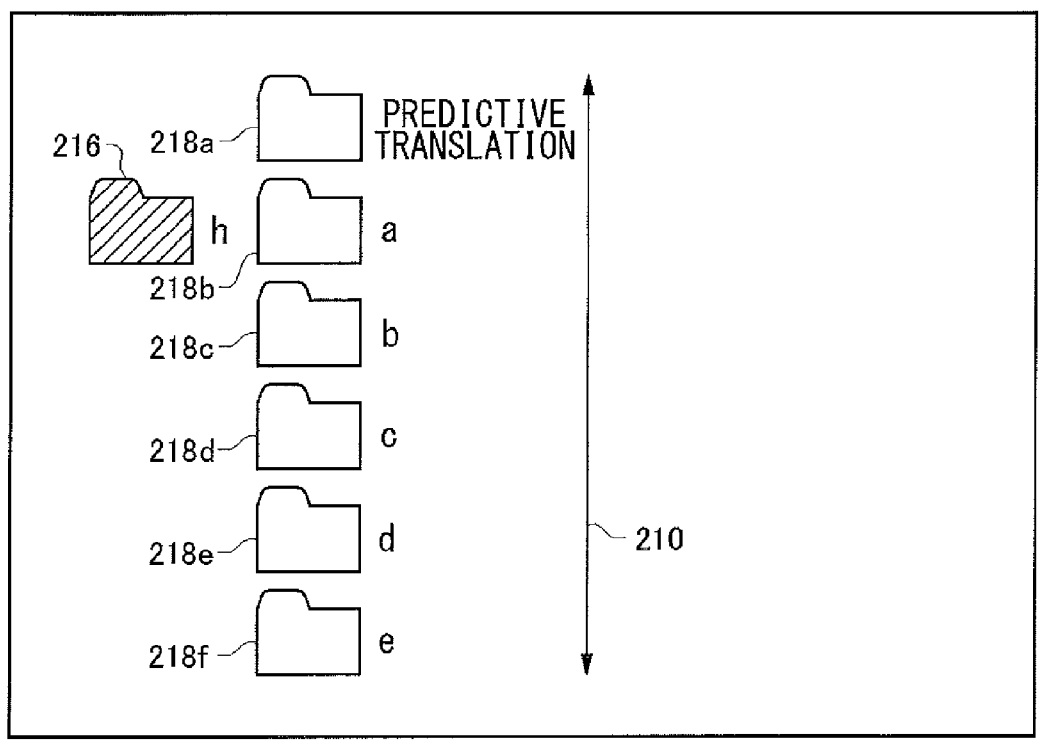
Figure 10:
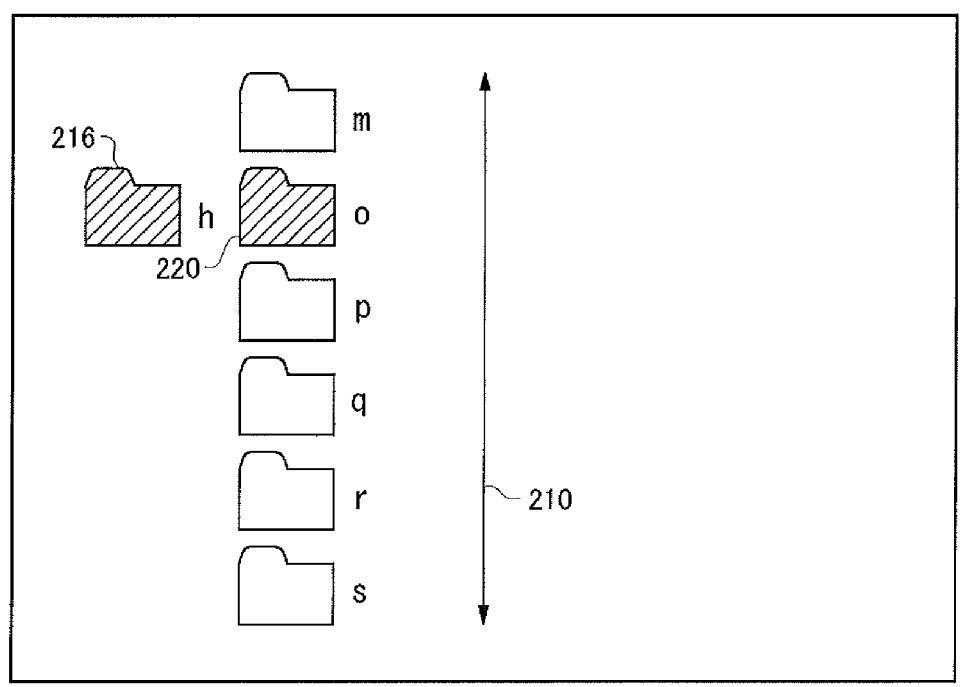

As shown in FIG. 9, among the PREDICTION TRANSLATION folder and the character folders from "a" to "z" of the second layer, only the character folders that fall in the display range of the screen in the vertical direction 210 are displayed (numerals 218a to 218f), while the screen is scrollable in the vertical direction 210. The user selects and opens the "o" folder (numeral 220) at the second layer as shown in FIG. 10 (Step 412).

The client 100 issues the command, "BrowseDirectChildren 46," which designates the ID "46" of the selected "o" folder of the second layer (Step 414), to the content server 300.

Subsequently, the sequence of the procedure (the processes surrounded by the dashed line indicated by numeral 420), which includes both the generation of the character folders (Step 408) and the transmission of the character folder information (Step 410) by the content server 300 and both the selection of the character folder (Step 412) and the ID designation of the selected character folder (Step 414) by the client 100, is repeated so that the character folders are selected one after another while the folder hierarchy is traced downwards.

Figure 11:
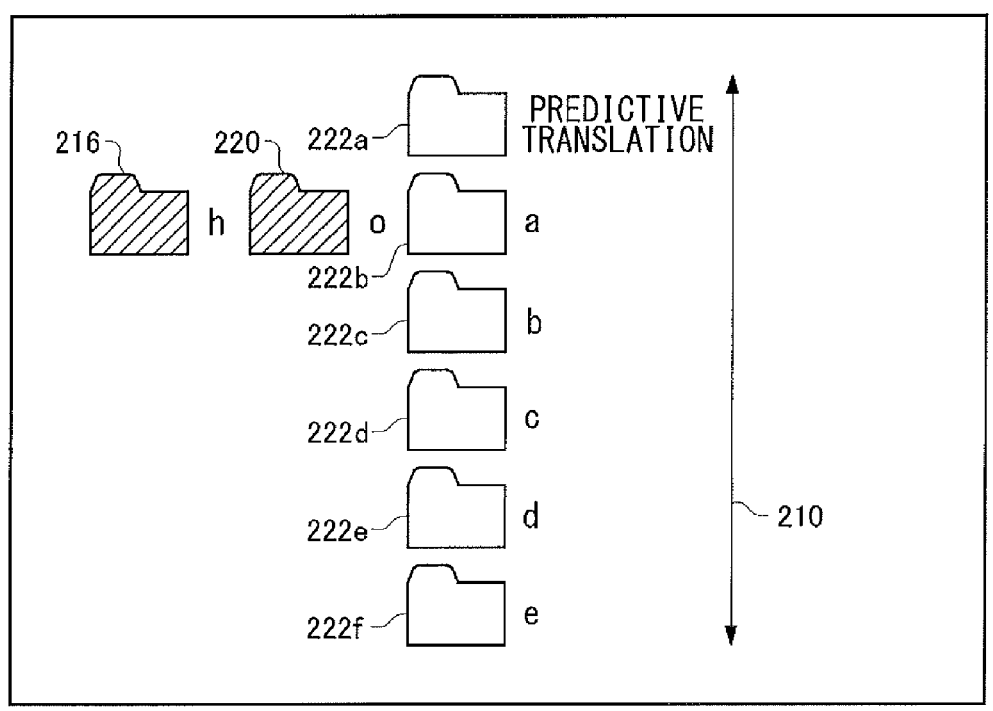
Figure 12:
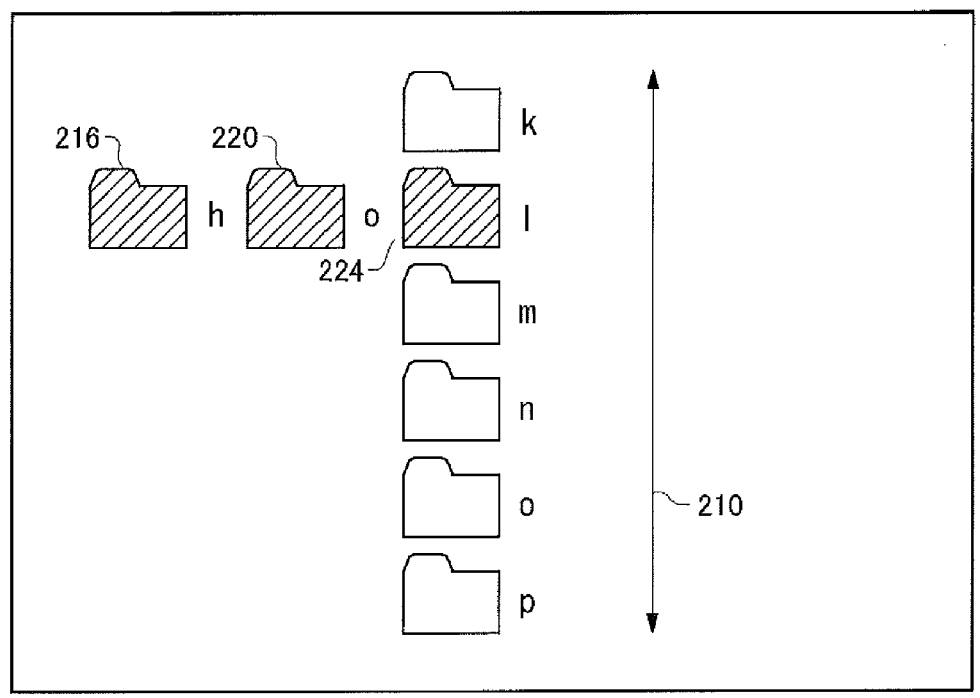
Figure 13:
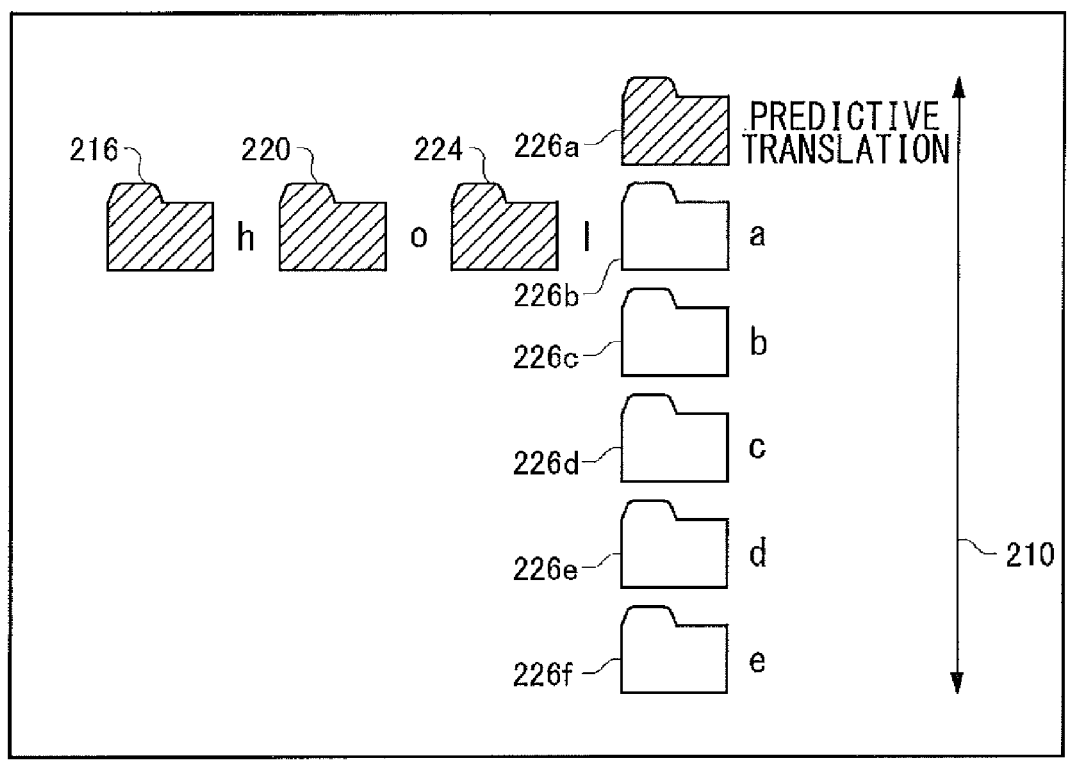

As shown in FIG. 11, the PREDICTIVE TRANSLATION folder and a part of the character folders from "a" to "z" of the third layer are displayed under the "o" folder selected at the second layer (numerals 222a-222f). Consider that the "l" folder is selected at the third layer, as shown in FIG. 12. Consequently, as shown in FIG. 13, the PREDICTIVE TRANSLATION folder and a part of the character folders from "a" to "z" of the fourth layer are displayed under the "l" folder selected at the third layer (numerals 226a-226f).

Subsequently, by selecting the "l" folder at the fourth layer and the "y" folder at the fifth layer, and by finally selecting the CONFIRMATION folder, the user can specify the character sequence "holly". Alternatively, as shown in FIG. 13, consider that the user selects the PREDICTIVE TRANSLATION folder (numeral 226a) at the fourth layer after he/she selects the "h", "o", and "l" folders sequentially (Step 432).

The client 100 issues the command, "BrowseDirectChildren 85," which designates the ID "85" of the PREDICTIVE TRANSLATION folder (Step 434), to the content server 300. Referring to the dictionary database, the content server 300 predicts some words from "hol" (Step 436). In this example, three words, "holiday," "holly," and "hole in one," are predicted as keywords.

The content server 300 generates the three candidate folders of "holiday," "holly," and "hole in one" in the PREDICTIVE TRANSLATION folder and gives back to the client 100 the following information of these candidate folders (Step 438).

| Type | name | ID | PID |
|---|---|---|---|
| container | "holiday" | 301 | 85 |
| container | "holly" | 302 | 85 |
| container | "hole in one" | 303 | 85 |

Figure 14:
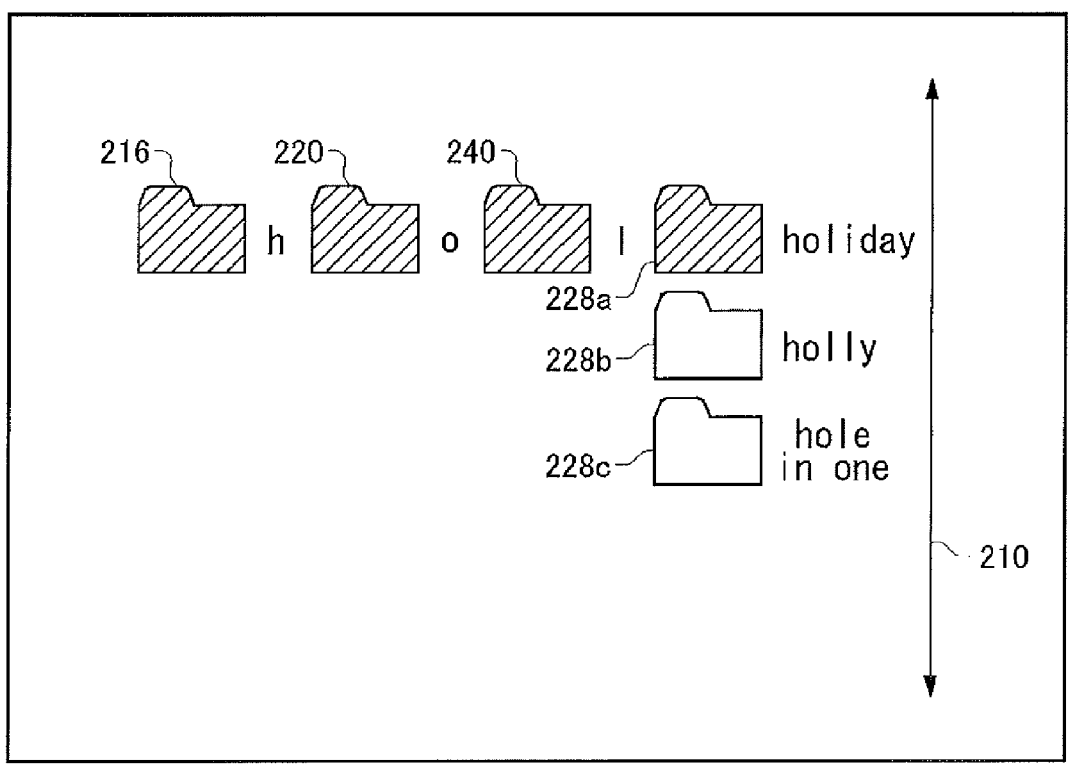

As shown in FIG. 14, the three candidate folders of "holiday", "holly" and "hole in one" are displayed (numerals 228a, 228b, 228c).

When the user selects the "holiday" folder as a target folder, the client 100 issues the command, "BrowseDirectChildren 301," which designates the ID "301" of the "holiday" folder (Step 440), to the content server 300.

A sequence of the procedure, surrounded by the dashed line indicated by numeral 430, which includes the selection of the predictive translation folder (Step 432), the ID designation of the predictive folder (Step 434), the keyword prediction (Step 436), the transmission of the candidate folder information (Step 438) and the ID designation of the target folder (Step 440), is skipped when the user does not demand the predictive translation of the word.

The content server 300 generates a character sequence based on the sequence of the character folders selected by the user (Step 442). The content server 300 searches for the contents using a keyword the character sequence "holiday" generated from the sequence of the selected character folders or the name "holiday" of the PREDICTIVE TRANSLATION folder (Step 444). The content server 300 searches for the files, the filename or metadata of which contains the keyword of "holiday." For instance, Exchangeable Image File Format (Exif) information that includes the name of a person who took the photo, the time when the photo is taken, the place where the photo is taken, or the like may also be searched.

As a result of the search, two files of "holiday memory.mp4" and "study during holidays.avi" are hit, in this example. In this case, the content server 300 gives back to the client 100 the following information of the searched files (Step 446).

| Type | MimeType | ID | PID |
|---|---|---|---|
| file | "holiday memory.mp4" | 304 | 301 |
| file | "study during holidays.avi" | 305 | 301 |

Figure 15:
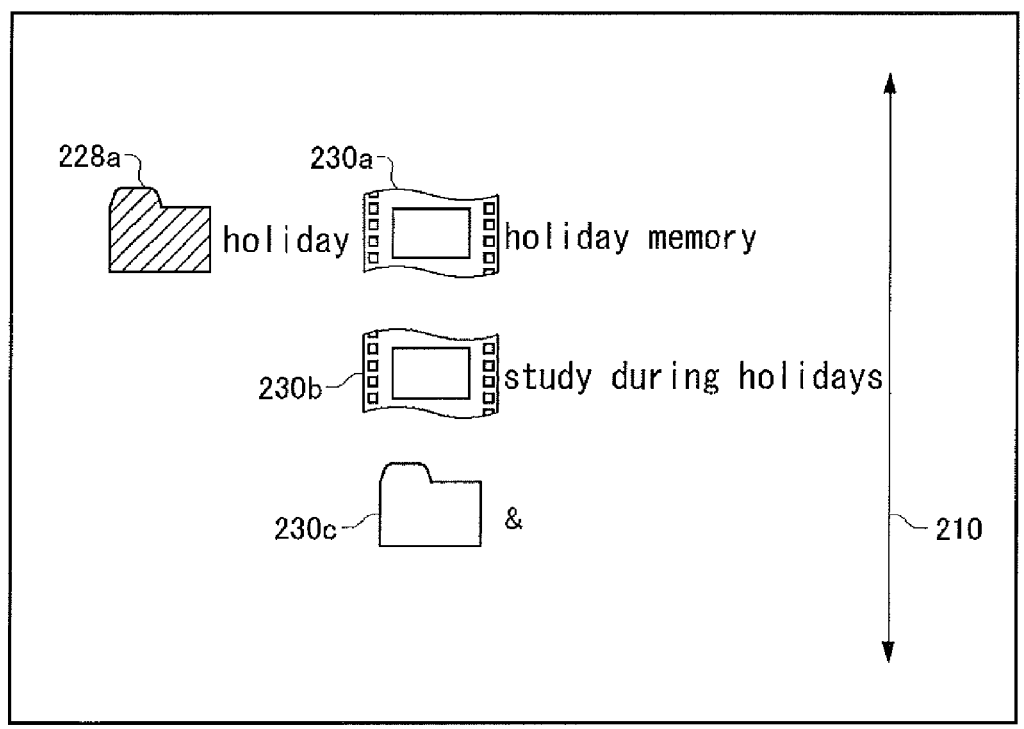

As shown in FIG. 15, "holiday memory.mp4" and "study during holidays.avi" (numeral 230a, 230b) are displayed under the "holiday" folder on the screen of the client 100. Although it appears to the client 100 that these files have been stored in the "holiday" folder, the content server 300, in reality, performs a keyword search for the contents subject to the management of this server and transmits the information of the files hit by the search to the client 100 as if the files were in the "holiday" folder.

Optionally, "&" folder (numeral 230c) may be displayed in the "holiday" folder. The "&" folder is used for adding a condition for the character sequence in order to narrow the search results when there are a large number of files found by the search. When the user selects the "&" folder, the character folders from "a" to "z" are displayed, and the user can specify the second character sequence as another keyword by selecting the character folders one after another in the folder hierarchy.

If the user selects, for instance, "holiday memory.mp4" (Step 448), the ID of the selected file is transmitted to the content server 300 (Step 450). The content server 300 transmits the selected file to the client 100 (Step 452). Since the file contains the declaration of the SourceURI attribute, the client 100 can play the content by retrieving the file by HTTP from the SourceURI (Step 454).

In the above explanation, the content server 300 does not start to search using the final character sequence generated as a keyword until the user finally selects the folder for confirming the character sequence. Alternatively, the content server 300 may start to search using as a keyword the partial character sequence generated based on a sequence of the character folders selected by the user, in mid-course before the user confirms the character sequence. For instance, when the user sequentially selects the "h", "o", and "l" folders, the content server 300 generates a partial character sequence "hol" in mid-course based on a sequence of the character folders selected so far by the user, and then searches for the contents by using "hol" as a keyword. The content server 300 returns the files obtained by search to the client 100. On the screen of the client 100, the files of the search result are displayed after the character folders from "a" to "z" under the "l" folder of the third layer. Thus, the selection of the character folders by the client 100, the character sequence generation, and the content search by the content server 300 are executed in parallel so that the contents can be searched by using a keyword of the partial character sequence based on the sequence of the character folders selected so far, and the files hit by the search can be displayed in the current selected character folder.

Figure 16:
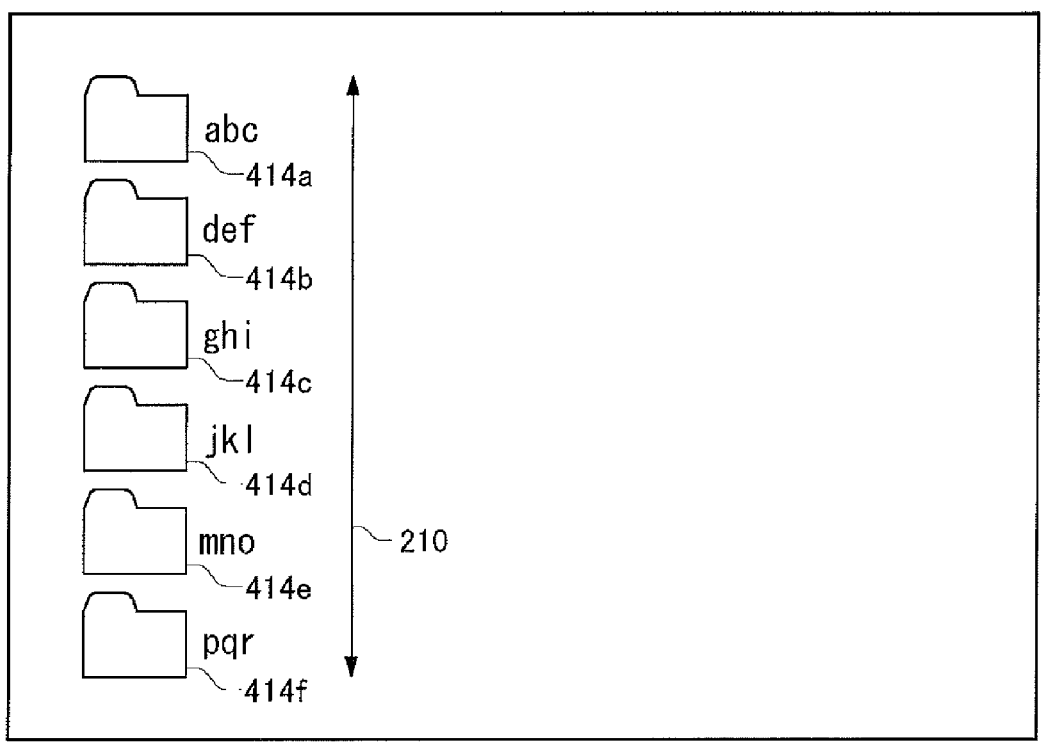

In the above explanation, any one of alphabetic characters from "a" to "z" is assigned to each character folder. Alternatively, two or more alphabetic characters may be assigned to one character folder. For instance, as shown in FIG. 16, the character folders (numerals 414a-414f) to which the three letters of "abc", "def", "ghi", "jkl", "mno", and "pqr" are assigned, respectively, may be displayed on the screen of the client 100. For instance, the user selects the "abc" folder to specify the letter "c" and selects the "mno" folder to specify the letter "n".

Figure 17:
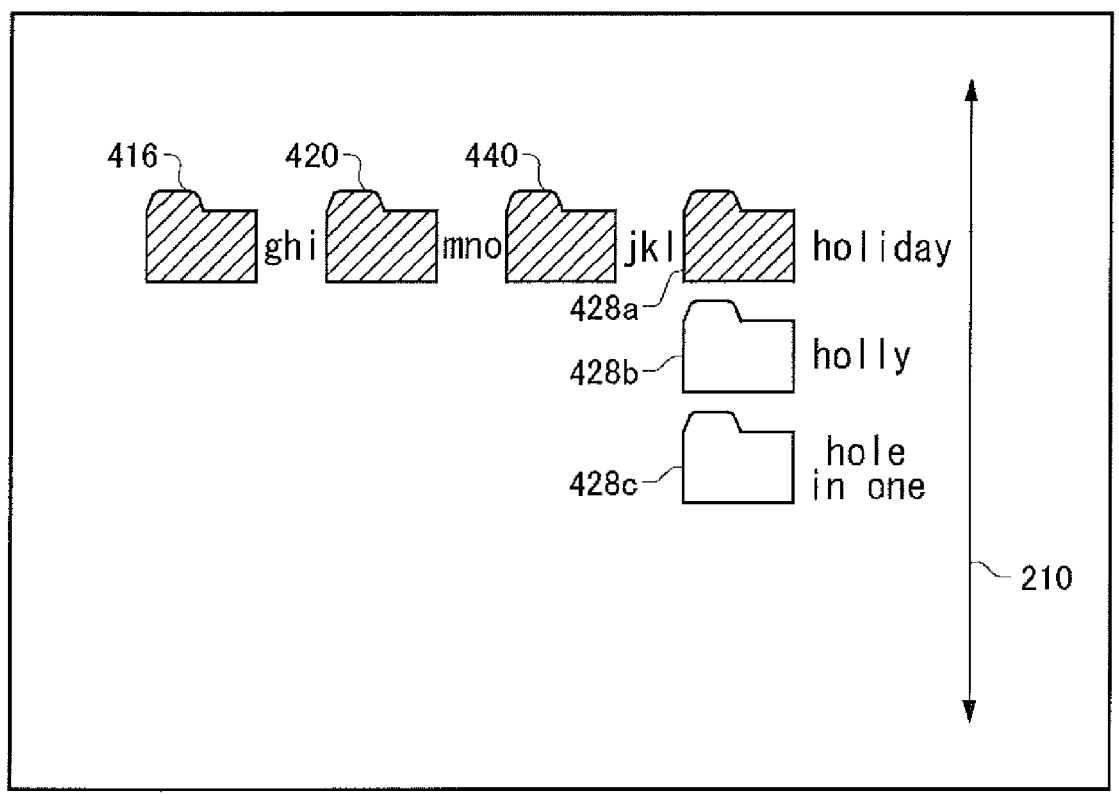

In order to select "h", "o", and "l", the user selects the "ghi" folder at the first layer, the "mno" folder at the second layer, and the "jkl" folder at the third layer. FIG. 17 shows a display screen when the user selects the PREDICTIVE TRANSLATION folder at the fourth layer after he/she selects the "jkl" folder at the third layer.

Since the "ghi" folder of the first layer (numeral 416), the "mno" folder of the second layer (numeral 420), and the "jkl" folder of the third layer (numeral 440) have been selected, there are 27 candidates for the combination of the three alphabetic characters. When the PREDICTIVE TRANSLATION folder is selected at the fourth layer, the three candidate words "holiday," "holly," and "hole in one" are retrieved as the meaningful character sequences, and the candidate folders, each of which corresponding to each candidate word, are displayed (numerals 428a, 428b, and 428c). The subsequent process is the same as the process explained with reference to FIG. 14 and FIG. 15.

As described above, according to the embodiment, it appears to the client 100, which is a DLNA player, that the user just operates to select the character folders while he/she traces the folder hierarchy downwards. Thereby, it becomes possible to search for the contents in the DLNA server without any changes made to the specifications of the conventional DLNA player. Therefore, it is not necessary to install a new interface such as a pseudo keyboard to input a character sequence to the DLNA player. It suffices that the client 100 is provided with an interface for manipulating the folders in accordance with the DLNA standard.

The present invention has been described based on the embodiments. These embodiments are merely exemplary, and it is understood by those skilled in the art that various modifications to the combination of each component and process thereof are possible and that such modifications are also within the scope of the present invention.

The content server 300 may memorize as a character sequence history the character sequence that has been selected as a keyword by the user and may generate the candidate folders, the name of each of which is the character sequence history, in a SEARCH HISTORY folder and provide the information of the candidate folders to the client 100. The SEARCH HISTORY folder contains one or more folders, each of which corresponds to the character sequence history specified in the past by the user. If the user selects any one of the folders of character sequence history, the content server 300 starts to search, and the client 100 can obtain the search result. The SEARCH HISTORY folder may be displayed at each layer of the character folders. In this case, the SEARCH HISTORY folder may contain one or more candidate folders, the name of each of which is the character sequence history that partially contains a sequence of characters identified so far until the current layer. For instance, when the user specifies the "h", "o", and "l" folders, the candidate folders with the folder names of "holly" and "hole in one" may be displayed in the SEARCH HISTORY folder according to the search history in the past.

By using the content search function of the present embodiment, a function for searching for Web contents can be provided in the DLNA player. The Web service of providing contents such as a movie, music, or the like provides an API for content search. Like the present embodiment, a search keyword is determined when the user specifies the character folders while tracing the folder hierarchy in the DLNA player, and then the DLNA server obtains a list of the filenames as a search result replied from the Web server and transmits the information of the files to the DLNA player. This scheme enables the DLNA player to access the contents in the Web server as if the contents were stored in the DLNA server.

The metadata may be automatically added to the contents stored in the DLNA server. For instance, if the DLNA server automatically determines the attributes of the contents such as a person who appears in a photo, scenery, color, or the like, and registers them as the metadata of the content files, this metadata can be used as search keywords resulting in the widening of the range of the search.

What is claimed is:

1. A computer program product embodied on a non-transitory computer readable recording medium having a computer program stored thereon, the computer program comprising:
   a code module for initializing a hierarchical directory folder structure by propagating one or more folders of an initial hierarchical layer;
   a code module for providing a terminal with identification information of said one or more folders propagated at the initial hierarchical layer, any intervening hierarchical layers, and a current hierarchical layer to be displayed by the terminal, wherein the identification information of each folder includes an indication of a respective character;
   a code module for receiving input from the terminal of a selected folder of the current hierarchical layer;
   a code module for identifying the respective character of the selected folder input from the terminal;
   a code module for evaluating a folder path by concatenating the respective character of the selected folder of the current hierarchical layer with any respective characters of any folders of any of the initial hierarchical layer and intervening hierarchical layers to create a character sequence;
   a code module for searching a memory for files using the character sequence as a search keyword;
   a code module for propagating one or more folders for a next hierarchical layer and for submitting the results of searching using the search keyword to be displayed at the next hierarchical layer; and
   a code module for referencing a folder ID table storage, wherein, when one of the folders of the current hierarchical layer is selected by the terminal, the respective character of the selected folder is identified by referencing the folder ID table storage and is concatenated onto the character sequence to be used as the search keyword.

2. The computer program product of claim 1, the program further comprising:
   a code module for predicting a candidate word that contains the character sequence created at the current hierarchical layer;
   a code module for propagating the one or more folders at the next hierarchical layer including a candidate folder and providing the terminal with identification information of the candidate folder including an indication of a respective character string;
   a code module for, upon receiving input from the terminal of a selected candidate folder, identifying a character string corresponding to the selected candidate folder, wherein the character string contains the candidate word;
   a code module for, when the candidate folder is selected at the terminal, searching for files by using as the search keyword the character string corresponding to the selected candidate folder in lieu of the character sequence previously created and generating one or more files retrieved by the search in the selected candidate folder and for providing the terminal with information of the generated files at the hierarchical layer of the selected candidate folder.

3. The computer program product of claim 1, the program further comprising:
   a code module for storing in a memory a character sequence history including a character sequence that has been previously used as a search keyword;
   a code module for propagating one or more candidate folders corresponding to the character sequence history in a search history folder and providing the terminal with identification information of the one or more candidate folders;
   a code module for, when a candidate folder is selected at the terminal, identifying a respective character sequence corresponding to the selected candidate folder;
   a code module for searching for files by using as the search keyword the respective character sequence, for generating one or more files retrieved by the search, and for providing the terminal with information of the generated files at the hierarchical layer of the selected candidate folder.

4. The computer program product of claim 3, wherein the code module for providing the terminal with information of the candidate folder propagates in the search history folder the one or more candidate folders corresponding to the character sequence history that at least partially contains a previous character sequence and provides the terminal with identification information of the one or more candidate folders.

5. The computer program product of claim 1, wherein the terminal is provided selection recognition of a folder through selection input by means other than with use of a pseudo device interface or a physical input device in which characters are presented.

6. A content providing apparatus comprising:
a content storage that stores files;
a folder propagator, which initializes a hierarchical directory folder structure by propagating one or more folders of an initial hierarchical layer, and which provides a terminal with identification information of said one or more folders propagated at the initial hierarchical layer, any intervening hierarchical layers, and a current hierarchical layer to be displayed by the terminal, wherein the identification information of each folder includes an indication of a respective character;
a folder identification information obtainer, which obtains input from the terminal of a selected folder of the current hierarchical layer;
a character sequence generator, which identifies the respective character of the selected folder input from the terminal and which creates a character sequence by concatenating the respective character of the selected folder of the current hierarchical layer with any respective characters of any folders of any of the initial hierarchical layer and intervening hierarchical layers, the character sequencing generator referencing a folder ID table storage, wherein, when one of the folders of the current hierarchical layer is selected by the terminal, the respective character of the selected folder is identified by referencing the folder ID table storage for the concatenation onto the character sequence; and
a searcher, which searches for files in the content storage by using as a search keyword the created character sequence and which submits to the terminal the results of searching using the search keyword,
wherein the folder propagator propagates one or more folders for a next hierarchical layer to provide to the terminal, which displays the one or more folders for the next hierarchical layer together with the results of searching using the search keyword.

7. A content providing system comprising:
a content providing apparatus; and
a terminal connected to communicate with the content providing apparatus,
(i) the content providing apparatus comprising:
a character folder propagator, which initializes a hierarchical directory folder structure by propagating one or more folders of an initial hierarchical layer, and which provides a terminal with identification information of said one or more folders propagated at the initial hierarchical layer, any intervening hierarchical layers, and a current hierarchical layer to be displayed by the terminal, wherein the identification information of each folder includes an indication of a respective character;
a folder identification information obtainer, which obtains input from the terminal of a selected folder of the current hierarchical layer;
a character sequence generator, which identifies the respective character of the selected folder input from the terminal and which creates a character sequence by concatenating the respective character of the selected folder of the current hierarchical layer with any respective characters of any folders of any of the initial hierarchical layer and intervening hierarchical layers, the character sequencing generator referencing a folder ID table storage, wherein, when one of the folders of the current hierarchical layer is selected by the terminal, the respective character of the selected folder is identified by referencing the folder ID table storage for the concatenation onto the character sequence; and
a searcher, which searches for files by using as a search keyword the created character sequence and which submits the results of searching using the search keyword to the terminal, and
(ii) the terminal comprising:
a user interface for receiving an operation of a user, the user interface comprising:
a means for displaying the hierarchical folder directory structure on the terminal with the identification information on said one or more folders of the current hierarchical layer;
a means for receiving an operation for selecting one of the folders at the current hierarchical layer;
a means for receiving from the content providing apparatus the results of searching and one or more folders of a next hierarchical layer; and
a means for displaying the one or more folders for the next hierarchical layer together with the results of searching.

8. A content providing method comprising:
initializing a hierarchical directory folder structure by propagating one or more folders of an initial hierarchical layer;
providing a terminal with identification information of said one or more folders propagated at the initial hierarchical layer, any intervening hierarchical layers, and a current hierarchical layer to be displayed by the terminal, wherein the identification information of each folder includes an indication of a respective character;
receiving input from the terminal of a selected folder of the current hierarchical layer;
identifying the respective character of the selected folder input from the terminal;
of the current hierarchical layer with any respective characters of any folders of any of the initial hierarchical layer and intervening hierarchical layers to create a character sequence;
searching a memory for files using the character sequence as a search keyword;
propagating one or more folders for a next hierarchical layer and submitting the results of searching using the search keyword to be displayed at the next hierarchical layer; and
referencing a folder ID table storage, wherein, when one of the folders of the current hierarchical layer is selected by the terminal, the respective character of the selected folder is identified by referencing the folder ID table storage and is concatenated onto the character sequence to be as the search keyword.

\* \* \* \* \*